Oct. 21, 1958    E. SCHMUED ET AL    2,856,820
ROCKET LAUNCHING MEANS
Filed April 26, 1954    7 Sheets-Sheet 1

INVENTOR:
Edgar Schmued
Julius G. Villepigue
By Herbert E. Metcalf
Their Patent Attorney Oct. 21, 1958    E. SCHMUED ET AL    2,856,820
ROCKET LAUNCHING MEANS
Filed April 26, 1954    7 Sheets-Sheet 2

INVENTORS:
Edgar Schmued
Julius G. Villepigue
By Herbert E. Metcalf
Their Patent Attorney Oct. 21, 1958

E. SCHMUED ET AL

2,856,820

ROCKET LAUNCHING MEANS

Filed April 26, 1954

INVENTORS:
Edgar Schmued
Julius F. Villepigue
by Herbert E. Metcalf
Their Patent Attorney

Oct. 21, 1958 E. SCHMUED ET AL 2,856,820
ROCKET LAUNCHING MEANS
Filed April 26, 1954 7 Sheets-Sheet 6

INVENTORS:
Edgar Schmued
Julius G. Villepigue
By Hubert E. Metcalf
Their Patent Attorney

INVENTORS:
Edgar Schmued
Julius F. Villepigue

By Hubert E. Metcalf
Their Patent Attorney

United States Patent Office 2,856,820
Patented Oct. 21, 1958

2,856,820

ROCKET LAUNCHING MEANS

Edgar Schmued, Los Angeles, and Julius G. Villepigue, Inglewood, Calif., assignors to Northrop Aircraft, Inc., Hawthorne, Calif., a corporation of California Application April 26, 1954, Serial No. 425,594

3 Claims. (Cl. 89—1.7)

This invention pertains to rockets, and more particularly to a means and method of constructing, launching, and igniting a rocket to achieve maximum accuracy of trajectory thereof and maximum volumetric and weight efficiency for the rocket and launcher combination.

Throughout the specification and claims of the present application, the meaning of the word "rocket" is used as including both guided or unguided self-propelled reaction driven missiles.

When any elongated missile is propelled lengthwise through the air, it has a tendency to tumble; that is, instead of proceeding with its longitudinal axis parallel to the line of flight, this axis may rotate erratically with respect to the line of flight.

Several expedients reducing this tendency have been used. The missile can be launched by forcing it through a rifled barrel to provide spin stabilization, as is customary with bullets and artillery shells; or the missile can be provided with rearwardly attached fins, as is customary with arrows and darts, and with most of the presently used rockets. It has also been proposed to use a portion of the missile propellant to spin a rocket in flight.

The first expedient can be made to impart a satisfactory initial stabilizing spin to a rocket, but only at the cost of high barrel weight and the development of high recoil forces, both of which are particularly undesirable when rockets are to be launched from aircraft. Providing rockets with fins, as is customary, contributes to aerodynamic drag losses and does not entirely eliminate tumbling during the initial portion of the flight. Rockets must accelerate from a normal relative resting position to maximum flight speed, and as rocket velocity is low as it leaves a launching mechanism, the missile does not have sufficient relative air speed to provide complete fin stabilization during the initial portion of its flight.

Stabilization of rockets by the use of fins is even less effective in airplanes at high altitudes, due to the rarefication of the air, and fin stabilized rockets that may behave properly in sea level flight often do not operate to provide accurate trajectories at 40,000 feet, for example. Also, fin stabilized rockets launched rearwardly from a fast moving vehicle, fly backwards through the air until the rocket motor develops sufficient thrust to exceed the airspeed of the launching device. Since the finned rocket is designed for gaining stability from its flight into a relative wind, it tends to tumble when moving backwardly through the air, at the instant of launching.

It is the initial instability of fin stabilized rockets that, for all practical purposes, precludes the launching of finned rockets rearwardly from an airplane. Forwardly launched rockets are launched into a positive relative wind due to the forward speed of the aircraft. A rearwardly launched rocket is launched "down wind" and, leaving the airplane as it does, usually in turbulent air and actually flying backwardly relative to the surrounding air, the tumbling effect in a rearwardly launched rocket is much more pronounced than in a forwardly launched rocket. Furthermore, if any attempt is made to rearwardly launch a finned rocket from an airplane at an angle to the airstream, the rocket is almost certain to be displaced from any desired trajectory by adverse conditions in the airstream as it leaves the craft so that accuracy is completely lost.

When a rocket is spun by utilizing energy from its own propellant a loss of range inevitably results. While such a method can be used to maintain or prolong the effect of an initial spin without too great a loss of range, the use of rocket energy for imparting a satisfactory initial spin involves entirely too large a range loss to be practical.

Accordingly, among the objects of this invention are:

To provide means and method for imparting a spin to a rocket in a launching tube, which spin can be used to initiate ignition of the rocket propellant if desired.

To provide a means and method whereby spinning, and only spinning, of a rocket permits and initiates ignition of the rocket propellant.

To provide a means and method of igniting a spin-stabilized rocket in proper relation to initial rocket rotation.

To provide a means and method for automatically igniting the propellant of a spin-stabilized rocket when the rocket starts to spin.

To provide a spin-stabilized rocket in which the propulsion charge is ignited only when the rocket is rapidly rotated or spun about its axis, and in which the possibility of accidental ignition of the charge, such as might occur when the rocket is inadvertently dropped or subjected to other type of shock is eliminated.

And to provide a coordinated rocket, rocket launching system, and rocket ignition system insuring absolute safety before firing, and optimum accuracy of trajectory after firing.

Briefly as to apparatus that is closely coordinated to obtain optimum accuracy of trajectory in rocket flight, the invention can include a rocket to be spin-stabilized, a launching bed such as a smooth bore tube for example, means for spinning the rocket by outside power while in the launching bed, and means for ignition of the propellant of the rocket as the rocket is spun. Means can also be used to restrain the rocket in the launching bed until the rocket spin has started; with automatic release of the rocket thereafter.

To provide a preferred coordination, the rocket can be made finless with all of the propellant positioned to direct the rocket exhaust thrust rearwardly without imparting any substantial initial spin to the rocket. Thus nearly all of the propellant force can be used for drive.

Initial stabilizing spin is imparted to the rocket by the cooperating structure, operation of the rocket and rocket launching bed which includes a source of power apart from the rocket, and means for coupling this power to a rocket in the launching bed in a direction to spin the rocket around its longitudinal axis, together with means for releasing this power at will to so spin the rocket. It is preferred that the socket be ignited automatically, as for example by means carried by the rocket responding only to centrifugal force developed by the spin, so that the rocket will leave the rocket bed with optimum spin, thereby providing maximum gyroscopic stabilization of the longitudinal axis as the rocket leaves the launching bed to enter on the initial acceleration phase of its trajectory in free air. To insure that the burning of the rocket fuel will be of sufficient magnitude to cause proper initial acceleration out of the bed, it is preferred to provide means to restrain the forward motion of the rocket in relation to the bed for about one complete rotation of the rocket after spinning starts.

Briefly as to method, a rocket is spin-stabilized by spinning the rocket around its longitudinal axis by energy applied from an outside power source, and then igniting the rocket propellant during spinning so that the rocket starts on its trajectory with optimum stability.

By the use of the means and method described and claimed herein, rocket accuracy is greatly improved without appreciably increasing the weight or complexity of either rocket or launcher. This improvement is particularly significant when the rocket encounters adverse air conditions before reaching maximum speed.

Still other advantages and objects of the invention will become apparent by perusal of the ensuing description of the appended drawings which show the invention; clearly illustrating to those skilled in the art the method of the invention together with several preferred apparatus embodiments which practice the method.

One particular and preferred form of rocket suitable for use in the practice of the present invention will first be described.

Figure 2:
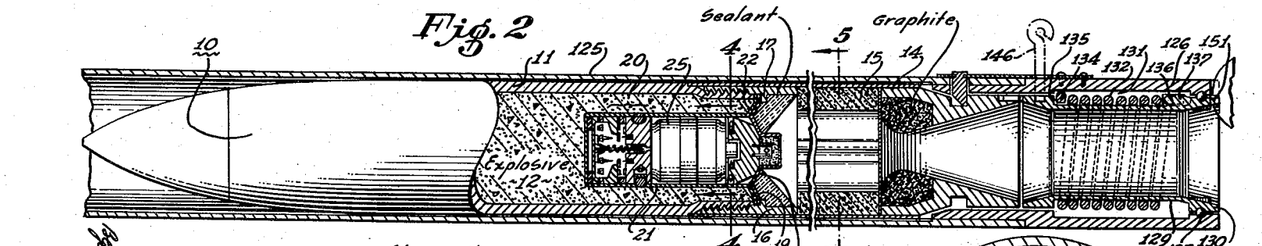
Figure 2 is a longitudinal sectional view of a rocket in position in a launching bed.

Referring to Figures 2, 3, 4, 5, 12 and 12a, and particularly to Figure 2, a rocket 10 comprises a pointed forward casing 11 containing an explosive 12, and an aft casing 14 containing a hollow propellent 15. The aft casing 14 is of thinner wall construction than is the forward casing 11 and is bonded to a securing ring 16, which is in turn threaded onto the rear portion of the forward casing 11, to form an elongated rocket body.

Clamped between a flange 17 on the securing ring 16 and the rear edge of the forward casing 11, is a circumferential double wall flange 19 extended laterally from a fuse and igniter assembly 20. A fuse housing 21 is preferably metallic and has one flange portion 22 formed on the rear end thereof. The outer portion of a rear wall or cap 24 (Figure 12a) overlies the flange portion 22 to complete the flange 19. The cap 24 serves to close the rear end of the housing 20. The fuse and igniter assembly 20 thus forms a wall separating the explosive 12 in the warhead from the propellant charge 15.

Within the housing 21 and generally centrally positioned therein, there is mounted an electric battery 25. This battery, as best shown in Figure 12a, has a dual cell arrangement composed of two cells, a front dry cell 26 and a rear dry cell 27, these cells having a common positive terminal 29 and two separated negative terminals 30 and 31. The common positive terminal 29 is the metal cylindrical case 25 of the battery, and is grounded through battery ring 34 to the fuse housing 21; the other two terminals 30 and 31 being formed as end caps at each end of terminal case 29 and insulated therefrom by sealing insulators 35. The construction of the cells 26 and 27 is conventional, with the exception that a depolarizer mass 36 is common to both cells. The front cell 26 is larger than the rear cell 27, for reasons later to be discussed.

The housing 21 constitutes a positively poled ground for the circuits energized by the battery 25.

Figure 4:
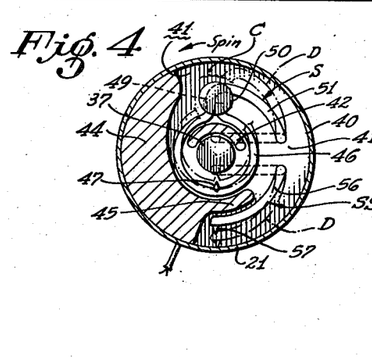
Figure 4 is a view partly in section and partly in elevation taken as indicated by line 4—4 in Figure 2.
Figure 5:
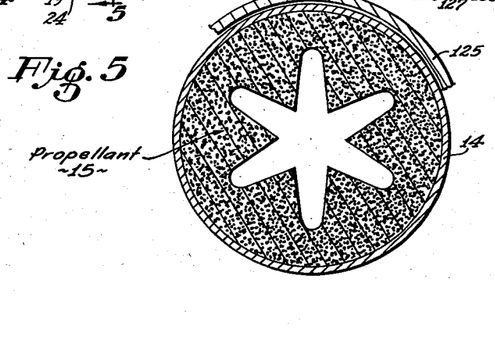
Figure 5 is a cross-sectional view of the rocket of Figure 2 taken as indicated by line 5—5 therein.
Figure 12:
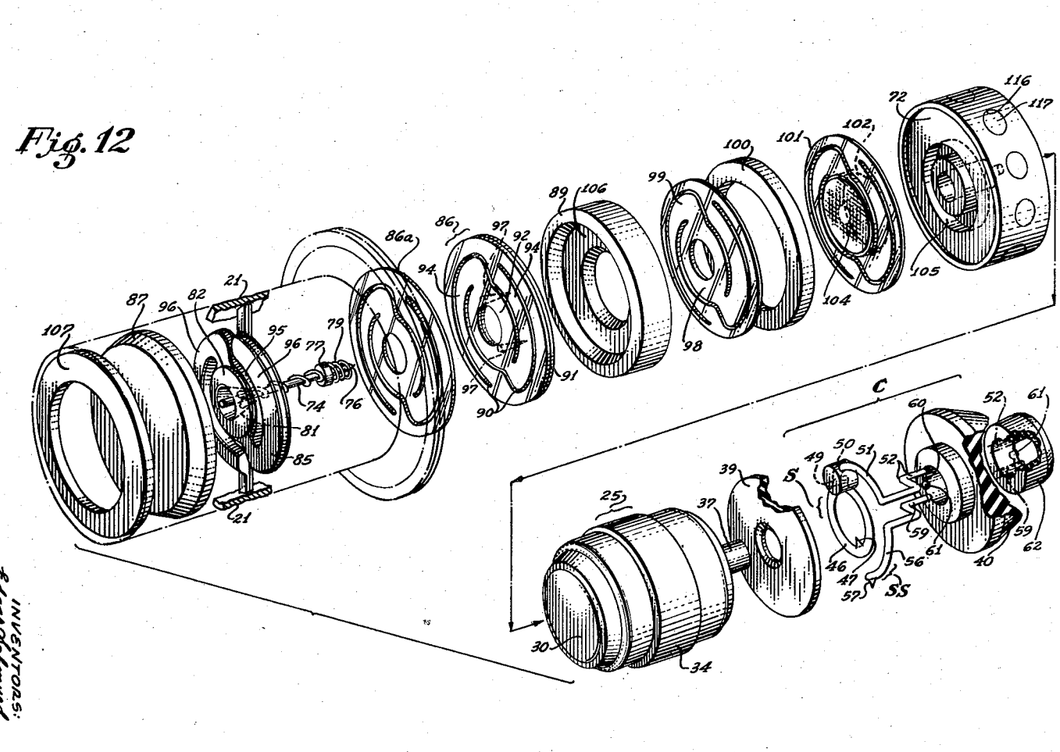
Figure 12 is an exploded perspective view of the ignition and fusing device and self destructor carried by the rocket of Figure 2.
Figures 12A, 12B, 12C:
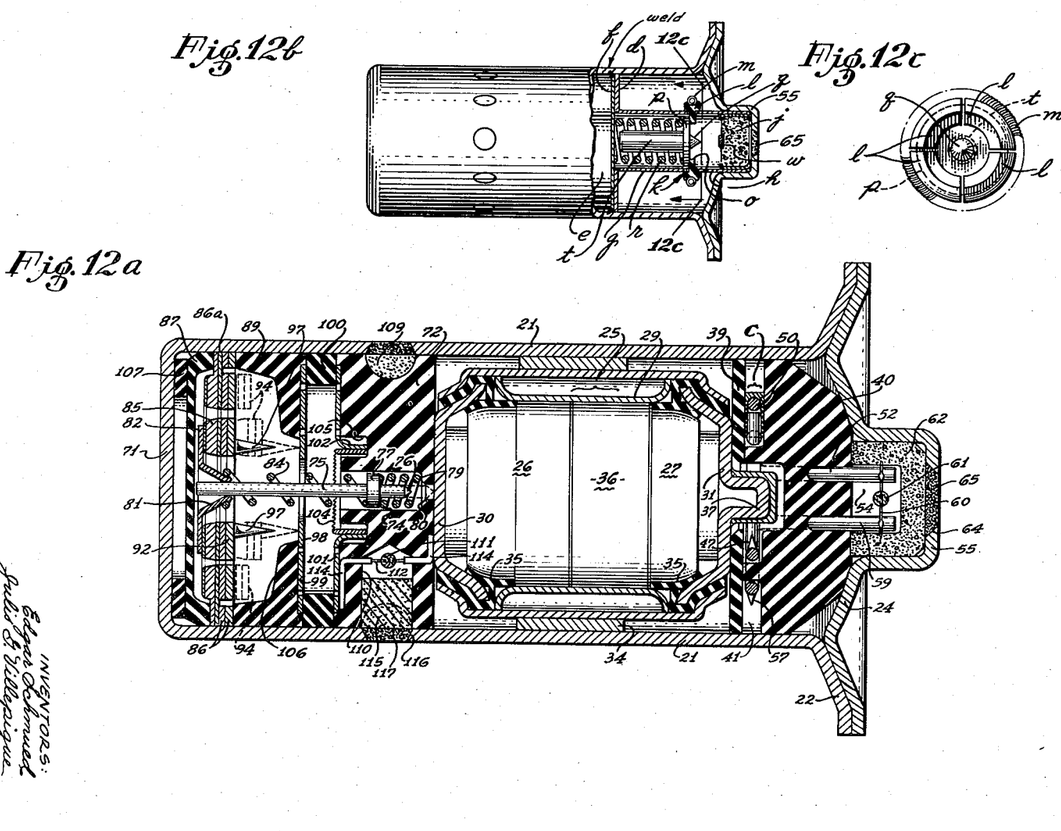
Figure 12a is a longitudinal sectional view of the same device as shown in Figure 12.
Figure 12b is a fragmentary view taken from Figure 12a showing another embodiment of a propellent ignition means responsive to centrifugal force.
Figure 12c is an end elevational view in cross-section taken on lines 12c—12c of Figure 12b.

Referring next to both Figures 12 and 12a, the terminal 31 of the above mentioned negative terminals of the battery 25 extends rearwardly from the central portion of the battery in the form of a boss 37. Transversely positioned within the housing 21 and abutting the rear terminal 31 is a relatively thin insulating disc 39 having a central opening therein through which the boss 37 extends rearwardly. At the rear of the disc 39 and extending to the rear cap 24 of the housing 21 is an insulating heat resisting terminal block 40. The face of the block 40 adjacent the disc 39 is relieved to form a flat, transverse chamber 41 in which switch means, to be described hereinafter, is mounted. The unrelieved portions of the forward face of the block 40 abut the disc 39 as best shown in Figure 4; these unrelieved portions consisting of an inner arcuate portion 42 and a larger side portion 44 having an outer arcuate portion 45 extending therefrom. Transverse chamber 41 contains a centrifugal switch assembly C next to be described.

Movably disposed within the chamber 41 shown in Figures 4 and 12 is a first switch member S consisting of a heavy wire formed into a ring 46 surrounding the rear terminal boss 37 of cell 27 and also embracing the inner arcuate portion 42 of the terminal block 40. Formed on the ring 46 is a contact member in the form of an inner point 47 directed inwardly toward the rear terminal boss 37 and disposed on the opposite side of the terminal boss 37 from the inner arcuate wall 42. The wire of the ring 46 then is continued radially as a doubled portion 49 opposite the inner point 47. A weight 50 is mounted on doubled portion 49. One end of the wire is extended rearwardly from the doubled portion 49 to form a resilient mounting arm 51, which extends circumferentially partially around the ring 46 and then turns rearwardly and enters into the terminal block 40, as best shown in Figure 12. This latter portion of the switch member S then turns within the terminal block 40 toward the center of the block and finally turns again to the rear and emerges rearwardly from the block 40 as a first primer terminal 52 into a primer chamber 54 formed in a rearward primer housing 55 in the end cap 24 (Figure 12a).

In practice it is preferred to mold the switch member S, just described, into the block 40 so that it is firmly positioned thereby. Any suitable configuration of the switch member S can be employed as long as it is mounted in the chamber 41 so as to permit the inner point 47 to be brought into engagement with the terminal boss 37 of the cell 27, and is so designed that the center of mass of the aggregate movable portion of the switch member is on the side of the terminal opposite the inner point 47, so that centrifugal force resulting from spinning of the rocket will force the switch member S inwardly as shown in Figures 12 and 12a, thereby bringing the inner point 47 into electrical contact with the battery terminal boss 37. The resiliency of the arm 51 permits such motion of the ring 46 and also biases the inner point 47 away from the boss 37, as shown in Figure 12a when the rocket is at rest.

While the single switch member S, described immediately above, will make electrical contact with the terminal boss 37 upon spinning of the rocket, such contact might also be effected if the rocket were to be dropped or subjected to sudden shock which would cause an acceleration of the rocket outwardly with reference to the orientation of Figure 12a. Such acceleration of the housing might well cause a relative upward movement of the ring 46 and bring the inner point 47 into engagement with the boss 37, thereby closing any circuit in which the switch member S is connected. Such dropping of the rocket might thus cause an unwanted ignition of the rocket propellant. Means have therefore been provided to make certain that the rocket propellant will be ignited only when the rocket is spun, and not when it is subjected to accidental forces while being handled.

Such means is provided in the form of a second switch member SS comprising a second resilient arm 56. One end of the second arm 56 has an outwardly directed contact portion in the form of an outer point 57 positioned radially outward from the inner point 47 on the ring 46, and on the opposite side of the outer arcuate wall portion 45 of the terminal block 40. The end of the second resilient arm 56 which carried the outer point 57 is free to move in chamber 41; and this arm extends circumferentially partially around the arcuate wall portion 45, and the ring 46 and then is bent rearwardly to enter the terminal block 40, as best shown in Figure 12, in a manner similar to the mounting of the first switch member S. The second switch member SS then continues through the terminal block 40 and emerges rearwardly into the primer chamber 54 in the primer housing 55 as a second primer terminal 59.

In the primer chamber 54, between the two primer terminals 52 and 59, is electrically connected a filament 60 which is adapted to be heated when an electric current is sent therethrough from cell 27. On and around the filament 60 is placed an igniting pellet 61, and a mass of primer material 62 fills the remainder of primer housing 55. In the rear wall of the primer housing 55 is a passageway 64 which communicates between the primer material 62 and the hollow interior of the propellant charge 15. The passageway 64 is normally closed with a frangible seal 65, best shown in Figure 12a.

The operation of the propellant igniter described above is substantially as follows: The rocket is first caused to spin within its launching bed, which may be a conventional launching tube. Such spinning can be effected by any suitable means, but preferably by devices herein later described.

The centrifugal force resulting from the spinning of the rocket causes the ring 46 and weight 50 of switch member S to swing upwardly (as the drawing is oriented in Figure 4) because that portion of the switch member S above the spin axis of the rocket is of greater mass than is the portion below. This brings the inner contact point 47 into electrical engagement with a terminal boss 37 of cell 27. Simultaneously, centrifugal force also swings the second arm 56 outwardly (downwardly as oriented in Figure 4) and brings outer point 57 into engagement with the inner face of the fuse housing 21. These portions of members S and SS are shown in dotted lines D in Figure 4.

Figure 3:
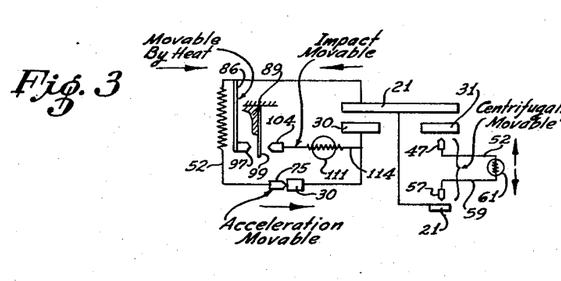
Figure 3 is a simplified circuit diagram of the ignition and fusing device carried by the rocket of Figure 2.

Closing of both of these switch member contacts closes a circuit which can be traced as seen in Figures 12 and 12a and in the circuit diagram of Figure 3 as follows: From the rear cell 27 of the battery 25 to the rear negative terminal 31, through boss 37, inner contact point 47, ring 46, arm 51, first primer terminal 52, through the filament 60, then to the second primer terminal 59, second resilient arm 56, outer contact point 57, housing 21, battery ring 34, and then thence to the positive grounded terminal of the dual battery 25 and cell 27 in particular. The potential of the rear cell 27 is thus applied across the primer filament 60, heating it to ignite the primer pellet 61 which in turn ignites primer material 62. The flame from the priming material 62 fractures frangible seal 65 and enters the inside of the propellant charge 15, igniting this charge to start rocket thrust.

It is to be noted at this point that the circuit under the control of the centrifugal switch is energized solely from the rear cell 27 of battery 25. Consequently, even if the two primer firing terminals 52 and 59 should be shorted after primer explosion, thereby rendering the rear cell useless, such shorting will not affect the operation of the forward cell 26, which is to be used at a later time in conjunction with the arming and detonation of the warhead 12 of the rocket.

In Figures 12b and 12c another embodiment of centrifugal propellant igniter is shown which is mechanically operated and thus requires no electrical circuit; the assembly being enclosed in the cylindrical fuse housing 21 rearwardly of battery chamber e and sealed off therefrom by a partition f which is preferably welded or brazed around the periphery thereof to the inner wall of housing 21. A sleeve g is coaxially mounted, and fastened, in any convenient manner such as to a base plate d, to partition f. Another sleeve h of the same diameter as sleeve g is retained in primer housing 55, and a primer pellet j is sized for retention in the end of sleeve h opposite frangible seal 65. Sleeve h terminates opposite the end of sleeve g leaving a clearance space k and a segmented centrifugal release collar l is mounted in clearance space k, being held in position by holding spring m. Radially extending restraining portions o of the collar l extend inwardly toward the axis of sleeves g and h, being there engaged with the collar p of firing pin q coaxially positioned in sleeve g. A compression spring r encircles the firing pin shaft t in the usual manner, being compressed between partition f and the firing pin collar p, being in abutment therewith. Opposite to and aligned with firing pin q, a percussion cap w, of any suitable type, is coaxially embedded in the primer pellet j.

When the rocket is caused to spin, the centrifugal force generated thereby moves the segmented restraining portions o of the centrifugal release collar l radially outwardly against the holding spring m; the inner radial restraining portions o moving away from firing pin collar p until the collar is disengaged permitting the compressed spring r to snap the firing pin q into percussion cap w to ignite the primer pellet j. In the same manner as with the centrifugal propellant ignitor switch of Figures 12 and 12a, the flame from primer pellet j ruptures frangible seal 65 and enters the inside of the propellant charge 15, igniting this charge to initiate rocket thrust.

The remainder of the mechanism in housing 21 will next be described, also best shown in Figures 12 and 12a.

In the forward end of housing 21, between the front wall 71 thereof and the forward terminal 30 of the dual battery 25 and cell 26 in particular, is located the fuse or detonation mechanism for the rocket warhead. Abutting the forward end of cell 26 is a relatively thick insulation disc 72 having an axial passage or opening 74 therethrough communicating with the forward negative terminal 30 of the cell 26. Axially mounted within the forward end of fuse housing 21 and opening 74 is an acceleration pin 75 of conducting material. The pin 75 is movable in the opening 74, so that the pointed rear end 76 of the pin 75 can be brought into contact with the forward battery terminal 30. The pin 75 is also provided with an annular shoulder 77 serving as a forward stop for a rear helical compression spring 79 disposed around the pin 75. The rear end of the rear spring 79 abuts an annular inwardly directed shoulder 80 formed by reducing the diameter of the opening 74 in disc 72 just forward of the battery terminal 30.

The forward end of the pin 75 is slidably engaged by three inwardly and rearwardly extending radial resilient fingers 81 forming part of a conducting contact disc 82. A second, and weaker front compression spring 84 extends around pin 75 from the shoulder 77 to the contact fingers 81. The contact disc 82 is secured to the front surface of the inner convolution of an electrical resistance heater 85 mounted on a bimetallic disc 86. The bimetallic disc 86 is composed of two lamina of different metals bonded together so that as the disc 86 is heated it tends to distort. A layer of electrical insulation 86a is interposed between the heater 85 and the bimetallic disc 86. This insulation 86a, while preventing electrical contact between the heater 85 and the bimetallic disc 86, still permits the transmission of heat from the heater to the disc.

At its periphery the disc 86 is clamped longitudinally between a forward insulating member 87 and an insulated spacer ring 89 disposed rearwardly of the disc.

Referring to Figure 12, it will be seen that the bimetallic disc 86 contains a pair of spiral slots 90 which split the disc 86 into an outer ring portion 91, which is clamped between the members 86 and 89; an inner ring portion 92; and a pair of arcuate arms 94, each of which connects the outer ring portion 91 with the inner ring portion 92. With the disc 86 thus divided by the slots 90, heating of the disc 86 by the heater 85 results principally in a longitudinal bending of the two arms 94 from the solid line position shown in Figure 12a to the dotted line position, where the inner ring portion 92 has been translated rearwardly along the axis of the housing 21 as shown in Figure 12a.

The heater 85, bonded to the bimetallic disc 86, has substantially the same configuration as the disc 86, as shown in Figure 12. Like the disc 86, the heater 85 is divided into an inner ring 95, and a pair of arcuate arms 96 which communicate with the inner ring portion 95 on opposite sides thereof and extend spirally around the inner ring portion 95 and having extensions which extend outwardly to contact the exterior of the housing 21. In this manner the heater 85 can be connected electrically to have two parallel paths which are connected across the housing 21 and the contact disc 82 secured to the inner ring portion 95 of the heater 85.

Mounted on the rear face of the inner ring portion 92 of the bimetallic disc 86 in electrical contact therewith are a pair of rearwardly extending electrical contact points 97. An intermediate contact means in the form of a conducting disc 99 is disposed just rearwardly of the spacer ring 89 and is clamped transversely in the housing 21 between the spacer ring 89 and a separator ring 100 but is not in contact with housing 21. The conducting disc 99 has substantially the same spiral configuration as the bimetallic disc 86.

Energization of the heater 85 causes the temperature of the bimetallic disc 86 to steadily increase and thus steadily translate the contact points 97 rearwardly until they engage the inner ring portion 98 of the intermediate conducting disc 99. Further heating of the bimetallic disc 86 causes the points 97 to move still further rearwardly, pushing the inner portion 98 of the intermediate conducting disc 99 rearwardly.

An impact actuator is provided in the form of an impact disc 101 positioned at the rear of the intermediate conducting disc 99 and having substantially the same spiral configuration as the discs 86 and 99. The outer ring portion of the impact disc 101 is clamped between the separator ring 100 and the thick insulation disc 72 but is not in contact with housing 21. The inner ring portion of the impact disc 101 is turned rearwardly to form a cylindrical flange 102 within which is fitted a contact cylinder 104, the forward edge of which is serrated to insure a good electrical contact against the inner ring portion of the intermediate conducting disc 99, when the two members are brought into engagement with each other. An annular groove 105 is formed in the forward face of the thick insulation disc 72 in order to accommodate flange 102 and contact cylinder 104.

A back-up shoulder 106 is formed on the spacer ring 89 extending inwardly far enough to overlie the outer edge of the inner ring portion of the intermediate conducting disc 99 without interfering with the rearward motion of the contact points 97. This back-up shoulder 106 serves to prevent conducting disc 99 from vibrating, and also prevents the inner ring portion of conducting disc 99 from being pushed forward by the contact cylinder 104 in the event the rocket should be dropped during loading.

A shock pad 107 is placed between the front wall 71 of the housing 21 and the forward insulating member 87, so that the several parts of the fuse mechanism are firmly held between the forward terminal 30 of the cell 26 and the front wall 71 of the housing 21.

Around the outer periphery of the thick insulating disc 72 is an annular groove 109. Extending inwardly from the groove at one point is a radial bore 110 in which is located an electrically fired detonator pellet 111, mounted on a detonator filament 112 connected between the forward battery terminal 30 and the outer ring portion of the impact disc 101 by means of conductors 114. The groove 109 and a portion of the passage 110 are filled with an explosive primer 115. The groove 109 communicates with the explosive 12 in the warhead by means of a plurality of holes 116 spaced circumferentially around the housing 21. The holes 116 are closed by a burnable sealant 117.

The impact disc 101 is made of relatively springy material, so that when the rocket strikes a target, the central portion of the disc 101, including the contact cylinder 104, is impelled forward relative to the other part of the mechanism, so as to come into electrical contact with the intermediate conducting disc 99. The disc 99 is restrained against forward movement by the back-up shoulder 106 and disc 86, on the other hand, is relatively stiff, so as to be substantially unaffected by longitudinal accelerations and decelerations of the rocket. All three discs, 86, 99, and 101, are of conducting material as is the contact disc 82, fingers 81, and the acceleration pin 75. Each of the several parts of the detonation mechanism is constructed with substantial polar symmetry as reference to Figures 12 and 12a will indicate. In this way, internal stresses resulting from the centrifugal forces of the spinning of the rocket are minimized.

Operation of the warhead detonation mechanism is substantially as follows: As soon as the rocket propellant charge 15 is ignited by the centrifugal switch assembly C, forward acceleration is imparted to the rocket, which exists for the duration of the burning of the propellant charge 15. This forward acceleration causes a rearward reaction force to act upon the acceleration pin 75 forcing it rearwardly into engagement with the front battery terminal 30 against the bias of the first compression spring 79. A circuit is thus completed from the forward negative terminal 30 of cell 27 through the pin 75, fingers 81, contact disc 82, to the heater 85. As the outer portions of the heater 85 are grounded to the case 21, the circuit then returns to the sheath of the battery 25 which is the positive terminal of forward cell 26. The heater 85 will thus be energized to heat the bimetallic disc 86. As the temperature of the disc 86 rises, the inner ring portion 92 thereof translates rearwardly.

If the rocket should be suddenly decelerated before it had reached a safe distance from the launcher, the contact cylinder 104 would of course be impelled forwardly into engagement with the intermediate conducting disc 99. However, this period would not have been sufficient to permit the heater 85 to cause the bimetallic disc 86 to move the contact points 97 into contact with the intermediate conducting disc 99. Thus the detonation circuit would not be completed, and the warhead will not explode.

However, as the contact points 97 continue to move rearwardly under continued heating of the bimetallic disc 86, by the heater 85, these contacts 97 come into engagement with the intermediate conducting disc 99. At this moment the fuse becomes armed, that is, operation of the contact cylinder 104 can now detonate the rocket, i. e., the circuit is now ready to be completed by forward movement of the contact cylinder 104.

In the meantime, however, and perhaps before the contact points 97 have engaged the intermediate disc 99, the propellant charge 15 may have burned out, so that the rocket starts to slowly decelerate. Under this condition, the acceleration pin 75 would tend to move forwardly under the bias of the first compression spring 79. However, under the rearward movement of the bimetallic disc, heater fingers 81 have by now placed the front spring 84 under compression and this force is transmitted to the pin 75 through its shoulder 77, thus keeping the pin 75 pressed against the terminal 30 against the counter bias of first spring 79. Thus the circuit to the heater 85 is maintained closed and the bimetallic disc 86 continues to be heated.

A predetermined time after the rocket has been armed it may be desirable that it should be automatically detonated if its has not by that time truck a target. This detonation is effected by the contact points 97 continuing to move rearwardly under continued heating by the heater 85; the points now pushing the inner portion of the intermediate conducting disc 99 to the rear. If the heating is continued long enough, the points 97 will eventually push the inner portion 98 of intermediate conducting disc 99 into engagement with the contact cylinder 104, thus completing the detonation circuit and exploding the rocket.

In normal operation, however, the rocket strikes a target some time after being armed and before being automatically exploded. Assume that by heater operation, the contact points 97 are in contact with the intermediate conducting disc 99. Striking of the target impels the contact cylinder 104 forward, without causing a corresponding movement of the discs 86 and 99, because of the difference of stiffness of these latter parts. Thus, the contact cylinder 104 is brought into engagement with the intermediate conducting disc 99, and a detonation circuit is completed. This detonation circuit can be traced from the sheath 29 of the cell 26 through the contact ring 34 and to the housing 21, through the bimetallic disc 86, contact points 97, intermediate conducting disc 99, contact cylinder 104, impact disc 101, conductor 114, filament 112 on which detonator pellet 111 is mounted, conductor 114, to the forward negative terminal 30 of cell 26. The detonator pellet 111 ignites and this in turn ignites the primer 115. The primer then explodes outwardly, fracturing the seals 117 and detonating the explosive 12 in the warhead.

If the rocket is suddenly decelerated before being armed, the contact cylinder 104 is prevented from pushing the intermediate disc 99 forwardly into engagement with the contact points 97, because of the presence of the back-up shoulder 106, which serves as a forward stop prohibiting any forward movement of the intermediate contact disc 99. At the same time, rearward motion of the intermediate contact disc 99, more particularly the inner ring 98 thereof, is still permitted under the urge of the contact points 97.

Data on one particular type of small spin-stabilized rocket constructed in accordance with the present invention are as follows:

| | |
|---|---|
| Diameter | 1.12 inches. |
| Total length | 22.3 inches. |
| Weight | 1.7 pounds. |
| Burning time | About .4 second. |
| End velocity | About 2500 ft./sec. |
| Warhead explosive | .2 pound. |
| Spin spring, pre-stress | 50 in./lbs. |
| Spin spring, full stress | 200 in./lbs. |
| Rocket held against forward motion | 1 turn. |
| Centrifugal switch makes contact at | About ⅔ turn. |
| Acceleration switch makes contact at | 50 g. |
| Warhead detonator contact delay | About 180 millisec. |
| (Rocket armed at about 100 ft. from launcher.) | |
| Automatic rocket destruction at about 1 mile from launcher. | |

Figure 9:
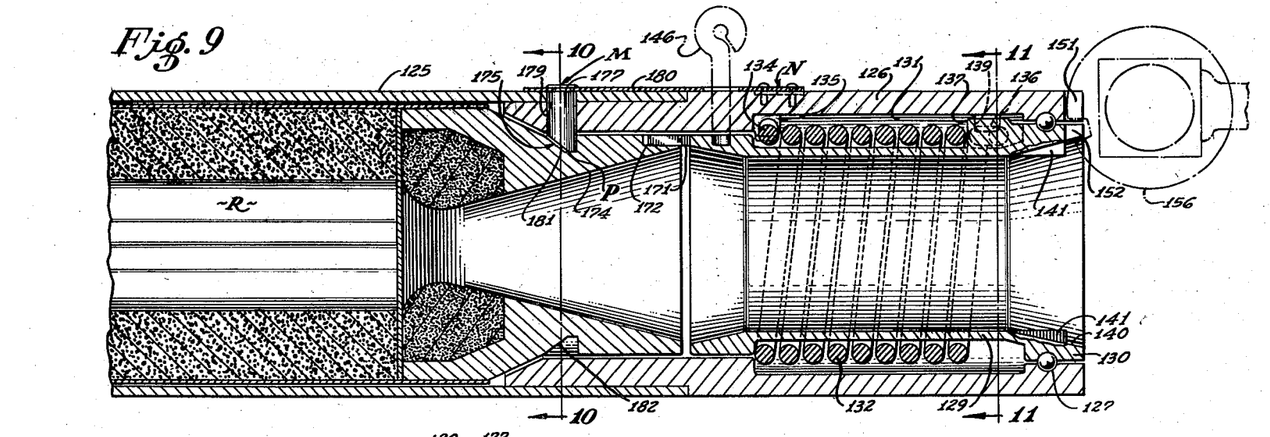
Figure 9 is an enlarged longitudinal sectional view of the rear of a launching bed with a rocket in place ready for launching.

The rocket just described is particularly suitable for launching from a launching bed which provides an initial stabilizing spin to the rocket. This spin can be imparted to the rocket by a number of means, several of which will be described in detail herein by reference to Figures 2, 9, 13, 16 and 18. A mechanical spinner will first be described as best shown in Figures 2 and 9.

A rocket launcher assembly is shown comprising a launching bed in the form of a tubular smooth bore launching tube 125 within which is disposed the rocket 10 to be launched.

At the rear of the launching tube 125 is a heavier spring casing 126 riveted or otherwise fastened to the tube 125. Rotatably mounted within the spring casing 126, by means of a rear ball bearing 127 only, is a spinner in the form of a tubular spinner sleeve 129, the rear edge 130 of which extends to the rear end of the heavier spring casing 126.

Spinner sleeve 129 is peripherally cut away intermediate the ends thereof, and the spring casing 126 is internally cut away opposite the cutaway portion of the sleeve to form a cylindrical spring chamber 131 in which is positioned a powerful torsion spring 132.

Figure 11:
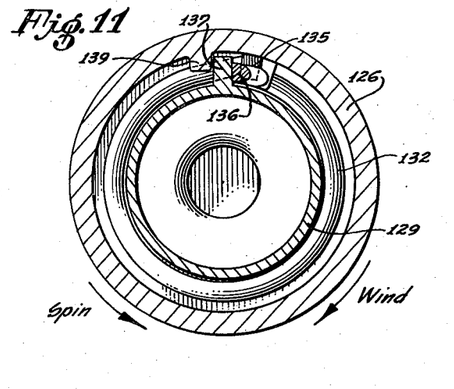
Figure 11 is a cross-sectional view taken as indicated by line 11—11 in Figure 9.

The forward end 134 of the spring 132 contacts a first abutment member 135 extending inwardly from the spring casing 126. The rear end 136 of the spring 132 is bent rearwardly and contacts a second abutment member 137 extending outwardly from the sleeve 129, just forward of ball bearing 127, as best shown in Figures 9 and 11.

Figure 10:
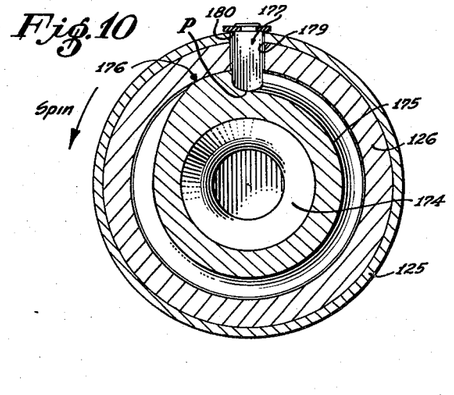
Figure 10 is a cross-sectional view taken as indicated by line 10—10 in Figure 9.

Means are provided for limiting the rotation of the sleeve 129 in the casing 126 to an arc of just less than 360°, as best shown in Figures 9 and 10. This means comprises the above mentioned second abutment member 137 of the sleeve 129, and a pre-stress stop 139 extending radially inward from the casing 126 adjacent ball bearing 127 into the path of second abutment 137 as best shown in Figure 11. In the position shown in Figure 11, the spring 132 is pre-stressed. When the sleeve 129 is rotated clockwise (viewed from the rear as in Figure 11) slightly less than one revolution, the spring 132 is additionally stressed by being unwound. This unwinding causes the convolutions of the spring 132 to move radially outwardly. To accommodate this radial expansion of the spring 132 when wound, the chamber 131 is made radially of greater magnitude than the expanded convolutions of the spring 132. When 1.1 inch rockets are to be spun, a pre-stress of about 50 pounds on spring 132 with a final wound stress of about 200 pounds, has been found satisfactory.

The means and method of winding and releasing the sleeve will next be described in conjunction with a bank of launchers, best illustrated in Figures 6, 7 and 8.

Sleeve 129 is, as before stated, hollow, and the interior thereof terminates rearwardly in an outwardly flaring coned surface 140. Two winding keys 141 are spaced diametrically on this surface, extending longitudinally thereof. A winding tool, such as a hand crank 142 as shown in Figure 7, has a cone 144 generally fitting the interior surface 140 of sleeve 129 and is provided with key slots 145 to receive winding keys 141.

To wind the spring 132, the crank 142 is inserted into the end of a sleeve 129 and the sleeve 129 is turned clockwise (Figure 11) slightly less than 360° until the rearwardly turned end 136 of the spring contacts the stop 139 on the casing 126. A locking pin 146 is then inserted through a rocket latch spring (later described), through casing 126 and into sleeve 129, thereby holding the sleeve 129 securely in full wound-up position (see Figures 6 and 9). These pins 146 are used only to hold the spring 132 in wound condition until a rocket releasing mechanism is attached, one form of which is best shown in Figures 6, 7 and 8.

A plurality of launching tubes 125 are mounted side-by-side on a support frame 150. The rear edge of each spring casing 126 is provided with an upper notch 151 and the rear edge of each sleeve 129 is provided with a sleeve notch 152, these notches matching when the spinner spring 132 is wound.

Figure 6:
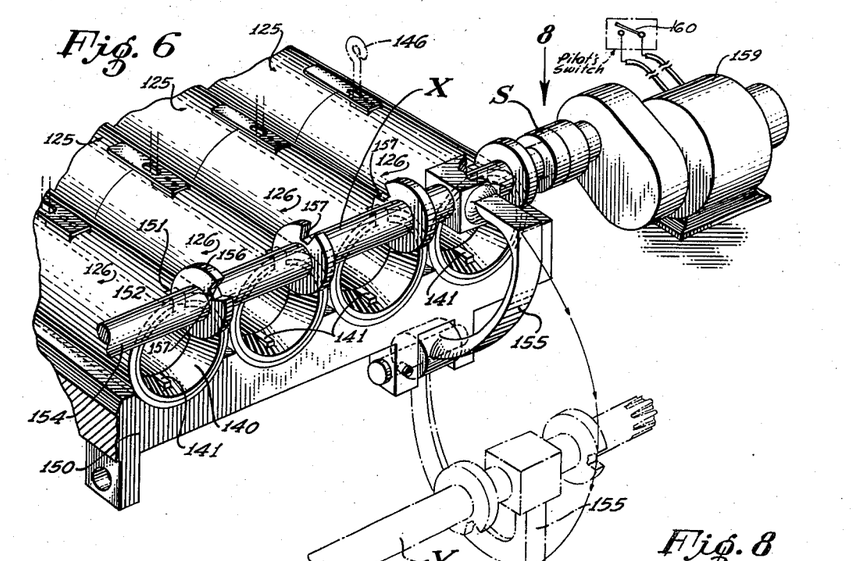
Figure 6 is a perspective view of the rear of a bank of four launching tubes showing one type of rocket release mechanism.
Figures 7, 8:
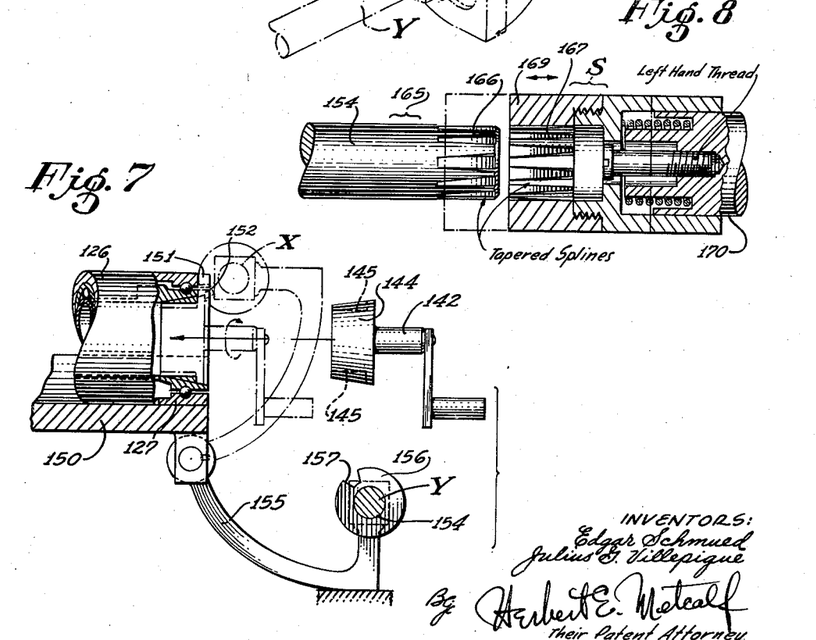
Figure 7 is a diagrammatic side view of the rear of a launching tube showing how a spin spring is wound.
Figure 8 is a view partly in section and partly in elevation of a release mechanism disconnect.

As shown in Figures 6 and 7, a control shaft 154 is mounted on hinged arms 155 (only one being shown) to swing from a position X adjacent upper notches 151 in the spring casing 126 to a lower position Y clear of the exhaust ends of the launchers. Spaced on shaft 154 are mounted release discs 156, each having a peripheral notch 157 therein, the edges of these discs being located along the shaft to pass through notches 151 and 152 of the sleeve 129 and spring casing 126, respectively, when the latter are adjacent and matched. Peripheral notches 157 are offset angularly one from another so that at one position of the shaft a peripheral notch 157 will register with matching notches 151 and 152 of only one launching tube at a time as control shaft 154 is rotated. Shaft 154 is rotated under the control of the aircraft pilot, as for example by a geared down stepper motor 159 under control of a pilot's switch 160. Shaft 154 is connected and disconnected from motor 159 by a spline disconnect S as best shown in Figure 8, for example. Here the motor end 165 of shaft 154 is provided with an external spline 166 fitting an internal spline 167 in a spring pressed sliding spline block 169, sliding on motor shaft 170.

Using any convenient means to lock the control shaft 154 in place after being connected to motor 159 and with all release discs 156 entering their respectively adjacent matching notches 151 and 152, and with no peripheral disc notches 157 registering with the matching notches 151 and 152, the locking pins 146 can be pulled and all sleeves 129 are then held in wound position by the release discs 156. Thereafter, as control shaft 154 is rotated, when and as each peripheral disc notch 157 registers with the matching notches 151 and 152 of each launching tube, the related sleeve 129 is released, permitting the spring to unwind and spin sleeve 129 on its ball bearing 127.

After all springs 132 have been wound and locked in wound condition, either by pins 146 or release discs 156, a rocket 10 is loaded in each launching tube 125 from the forward end thereof, and are coupled inside the launching tube to the spinning means contained in that tube.

Figure 13:
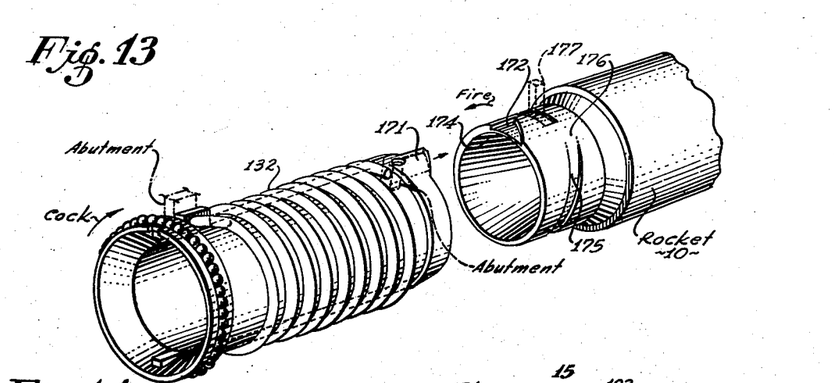
Figure 13 is an exploded perspective view of a spinner sleeve and spring, and the rear end of a rocket showing the coupling means.

In order to impart the spin of the sleeve 129 to the rocket 10, coupling means are provided between the sleeve and rocket. This coupling means comprises an angular driving key 171 extending forwardly from the forward edge of the sleeve 129; and a cooperating angular key slot 172 in the rear edge of the rocket nozzle 174 as best shown in Figure 13.

Around the outside of the rocket 10 in the outer surface of the rocket nozzle 174 is a circumferential camming groove 175 disposed forwardly of the recess 172, and extending almost 360° around the nozzle 174 as best shown in Figure 10.

Groove 175 has a maximum depth at one predetermined point P, the bottom of the groove 175 then having a gradually increasing radius as it extends around the nozzle 174 until the groove ends just prior to point P, leaving an ungrooved peripheral portion 176 on the nozzle.

Riding in the groove 175, so as normally to restrain the rocket 10 against a forward axial movement in the launching tube 125 while still permitting rotation or spinning thereof, is a hold pin 177. In and out radial movement of the hold pin 177 is provided for by mounting the pin 177 in a pin bore 179 in the launcher parts 125 and 126, so that the pin 177 is moved outwardly from the groove 175 when it rides up on the lower surface of this groove. The hold pin 177 is normally biased inwardly into engagement with the groove 175 by a leaf spring 180 secured to the outer end of the pin 177 at M, this spring being secured to the outer surface of the housing 126 at N.

It will be noted that a forward face 181 of the hold pin 177 is made sloping, and that the forward face 182 or side of the groove 175 is correspondingly sloped to fit the pin slope. The sloping face 181 of the pin 177 permits the pin 177 to be pushed or cammed outwardly as the rocket 10 is shoved into the launching tube 125 from the forward or muzzle end thereof.

It will further be noted, in Figure 13, that the ungrooved portion 176 of the rocket nozzle 174 is aligned longitudinally with the driving key slot 172 which is engaged by the driving key 171. By proper proportioning of these parts it is possible to make the weight removed by forming the recess 172 balance the unbalance created by unequal circumferential metal removal to form the camming groove 175, and thus retain rotational balance of the rocket nozzle, which balance is important when the rocket is launched in spinning condition.

Camming groove 175 is not strictly annular, but is slightly spiraled around nozzle 174 so that when the rocket 10 is rotated one full revolution while in launching position, the rocket is cammed forwardly enough so that the hold pin 177 cannot again fall into groove 175, even though the rocket has not been forwardly moved by the ignited propellant. This insures complete release of the rocket. In Figure 13 the spiraling of groove 175 has been exaggerated for clarity of illustration.

In operation, all spinners are wound and held in wound condition by release discs 156. The rockets 10 are loaded in tubes 125 and forced rearwardly so that the driving keys 171 fit into key slots 172 in the sleeves. Hold pins 177 snap into the grooves 175 at their deepest points, and the rockets are thus retained from longitudinal or rotational movement within the launching tube. As the pilot causes control shaft 154 to be rotated, one sleeve 129 will be released to rotate under the urge of the stressed spring 132. This rotation is imparted to the rocket 10 through the driving key 171 and it, too, starts to spin. This first rotational movement actuates the centrifugal switch C hereinbefore described as being a part of the rocket 10, and the rocket propellant 15 is ignited.

After one revolution of the rocket 10, the hold pin 177 is cammed completely out of the groove 175 and the rocket is free to move outwardly, under the urge of the propellant blast, the latter passing through the hollow body of the sleeve 129 to reach the atmosphere.

The rotating sleeve 129 is stopped after slightly less than one revolution by the contact of second abutment member 137 with stop 139. The rocket 10, however, keeps on spinning and leaves the launching tube 125 spin-stabilized on the initial portion of its flight.

As it may be desirable to impart an initial stabilizing spin to rockets substantially larger than the 1.1 inch rocket heretofore described as being spring spun, spinners providing more power than can conveniently be provided by a torsion spring, have been found desirable.

Consequently, other power operated means for providing sufficient energy for imparting the desired initial spin to a rocket are shown in Figures 14 to 19, inclusive. Two modifications of solid fuel operated turbines are there shown, as utilized to impart an initial stabilizing spin to a rocket.

Figure 14:
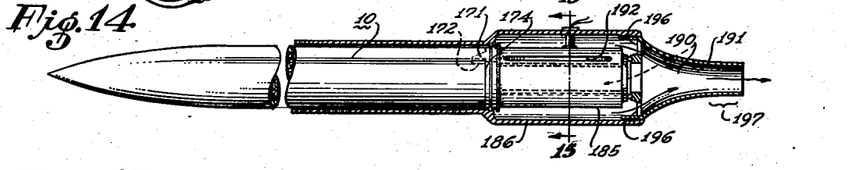
Figure 14 is a longitudinal sectional view of a rocket launcher in which initial spin of the rocket is imparted by one form of solid fuel turbine.
Figure 15:
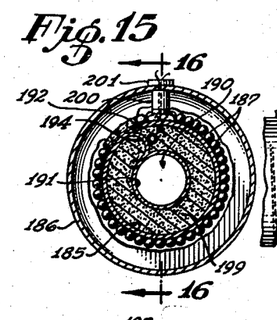
Figure 15 is a cross-sectional view taken as indicated by the line 15—15 in Figure 14.
Figure 16:
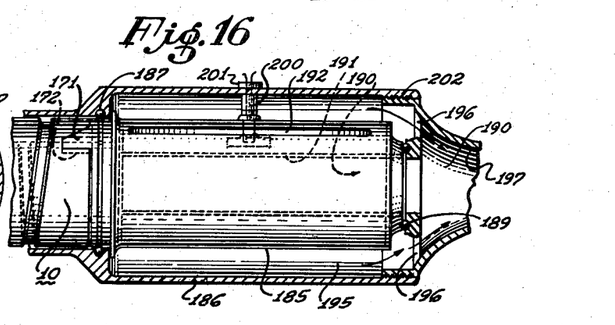
Figure 16 is an enlarged view partly in section and partly in elevation taken as indicated by the line 16—16 in Figure 15.

Referring first to Figures 14 to 16, inclusive, a turbine casing 185 is mounted in a launching tube 186 on front and rear ball bearings 187 and 189, respectively. The turbine casing 185 is hollow, and a central gas passage 190 is formed by an interior tube 191.

The turbine casing 185 is coupled to a rocket 10 inserted in the launching tube 186 in exactly the same manner as previously described for the spring driven sleeves 129 with the angular driving key 171 in this case extending from the forward end of the turbine casing 185 and cooperating with the key slot 172 in the rear edge of the rocket nozzle 174.

As was the case when the spring driven spinner was used, the rocket is held in position for somewhat less than 360° of rotation by the use of the hold pin 177 riding in the groove 175 of the rocket.

Turbine casing 185 is provided with an end-to-end peripheral slot 192 which, interiorly of the casing 185, is formed into a tangential exhaust nozzle by the insertion of a semi-circular longitudinal partition 194 joining interior tube 191 with the exterior of the casing, as best shown in Figure 15. The outer wall of launching tube 186 is increased in diameter around turbine casing 185 to provide an exhaust gas space 195 which is vented through turbine gas vents 196 leading into an exit nozzle 197 aligned with the gas passage 190 in the turbine casing 185, so that the gasses exhausted from the rocket when fired can reach the atmosphere through interior tube 191 and nozzle 197.

The turbine casing 185 is filled with a charge 199 of a conventional solid fuel propellant having a burning time in the order of about .25 second. The charge 199 is fired by a radially extended igniter 200 embedded in charge 199 adjacent slot 192 and connected to the exterior of the launching tube 186 through a plug 201 which is readily burnable and breakable on first rotation on turbine casing 185, for example. This plug 201 also prevents turbine casing rotation prior to firing the turbine.

Figure 17:
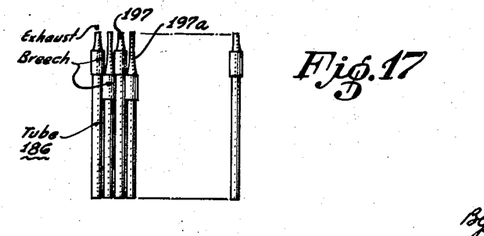
Figure 17 is a top plan view showing how launchers of the type shown in Figure 14 can be stacked.

A plurality of launchers are stacked as shown in Figure 17 to achieve maximum space utilization, so that the increased diameter portions will be in staggered relation. In this case the launchers having the enlarged portions forward may be provided with longer exit nozzles 197 to bring the openings of all nozzles into the same plane.

In operation, each turbine casing 185 is loaded with the rotating charge 199 of solid fuel, and is inserted in launching tube 186 as by removing the exit nozzle 197 at at threads 202. The igniter wires are then connected through plug 201 and nozzle 197 is replaced.

A rocket is then loaded into the launching tube and coupled to the turbine casing.

Under pilot control the fuel charge 199 of the particular turbine casing 185 is ignited at the slot 192. As the fuel burns, a tangential blast of gas issues from this slot, rotates the turbine casing at high speed, and thereby rotates the coupled rocket. As hereinbefore described, the first rocket rotation actuates the centrifugal switch and the rocket charge is ignited, the rocket being released for forward flight after making about a single turn. The time factors of the spinner charge and the rocket propellant charge are adjusted to cause the turbine to impart maximum spin acceleration to the rocket before the coupling is parted.

Figure 18:
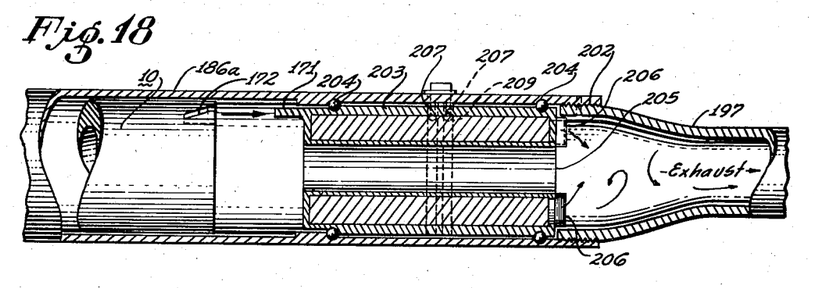
Figure 18 is a longitudinal sectional view of the rear portion of a rocket launcher using another form of solid fuel turbine to spin the rocket.
Figure 19:
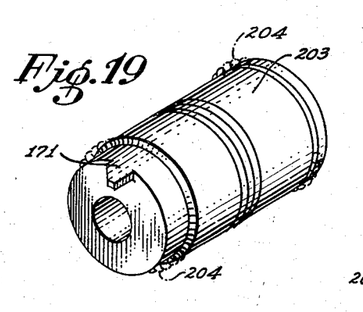
Figure 19 is a perspective view of the forward end of the turbine shown in Figure 18.
Figure 20:
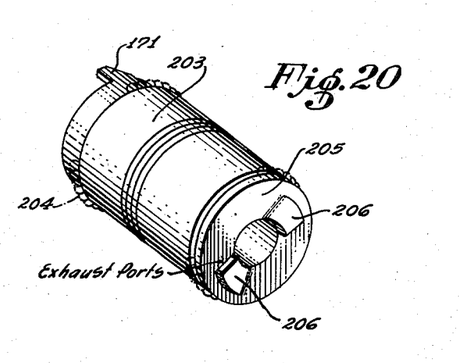
Figure 20 is a perspective view of the rearward or discharge end of the turbine shown in Figure 18.

In case it is not found desirable to increase the diameter of the launching tubes 186, a fuel operated turbine spinner can be used having rear exhaust ports as shown in Figures 18, 19 and 20.

Here, a hollow end driven turbine casing 203 is mounted on lateral bearings 204 in a launching tube 186a of uniform diameter, and is provided on the rear wall 205 with tangential exhaust nozzles 206, igniters 207 being positioned at each nozzle fired through wires passing through breakable plugs 209. The forward end of this type of turbine casing is provided as before described with the driving key 171 to which the rocket 10 is coupled by means of key slot 172 therein.

Figure 1:
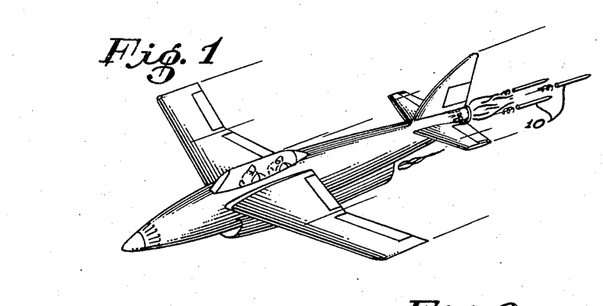
Figure 1 is a perspective view showing the present invention in use in a tail turret of an airplane.

It will be clearly seen from the preceding description that the present invention provides a satisfactory initial spin to a rocket before it leaves the rocket launcher without necessarily requiring any contribution from energy released from the rocket itself. Complete stability is thus provided as the rocket leaves the launcher and the launching vehicle, permitting, for example, satisfactory rearward launching as shown in Figure 1. Furthermore, all necessary precautions are taken to prevent accidental rocket propellant or warhead ignition.

While we have described the invention herein as utilized to provide initial spin for rockets having no inherent means for maintaining spin in flight, it is to be distinctly understood that the invention is equally adapted for use in providing a stabilizing initial spin for rockets that may incorporate means for providing energy for maintaining spin in flight, where it is not desired to utilize such rocket-carried energy to provide all or a major portion of the energy required for an initial stabilizing spin.

While the instant invention has been shown and described herein in what is conceived to be the most practical and preferred embodiments, it is recognized that departures may be made therefrom within the scope of the invention, which is therefore not to be limited to the details disclosed herein but is to be accorded the full scope of the claims appended hereto.

What is claimed is:

1. An apparatus for launching a spin-stabilized rocket comprising, in combination: a fixed tube; a rocket, including a propellant, mounted in said tube; means restraining said rocket against forward movement in said tube; means for spinning said rocket about its longitudinal axis inside of and relative to said tube; centrifugal means mounted on said rocket adapted to cause ignition of the propellant to apply thereby a forward thrust to said rocket; and cam means cooperating with said restraining means and adapted to release said rocket for forward movement in said tube after about one complete revolution of said rocket inside said tube.

2. An apparatus for launching a spin-stabilized rocket comprising, in combination: a fixed tube; a rocket, including a propellant, mounted in said tube; means restraining said rocket against forward movement in said tube; power means other than said propellant for spinning said rocket about its longitudinal axis inside of and relative to said tube; centrifugal means mounted on said rocket adapted to cause ignition of the propellant to apply thereby a forward thrust to said rocket; and cam means cooperating with said restraining means and adapted to release said rocket for forward movement in said tube after less than one complete revolution of said rocket inside said tube.

3. An apparatus for launching a spin-stabilized rocket comprising in combination: a fixed tube; a rocket, including a propellant, mounted in said tube; means restraining said rocket against forward movement in said tube; power means, including a source of stored energy in said tube, for spinning said rocket about its longitudinal axis inside of and relative to said tube; means for coupling said power means to the rocket to thereby spin the rocket; centrifugal means actuated by the spinning rocket adapted to cause ignition of the propellant to apply thereby a forward thrust to said rocket; and cam means cooperating with said restraining means and adapted to release said rocket for forward movement in said tube after said rocket has rotated inside said tube a predetermined portion of a revolution.

References Cited in the file of this patent

FOREIGN PATENTS

| | | |
|---|---|---|
| 25,005 | Great Britain | of 1893 |
| 436,932 | Italy | June 18, 1948 |
| 672,346 | Great Britain | May 21, 1952 |